United States Patent
Hao et al.

(10) Patent No.: US 10,330,070 B2
(45) Date of Patent: Jun. 25, 2019

(54) METHOD AND APPARATUS FOR OPERATING A STARTER FOR AN INTERNAL COMBUSTION ENGINE

(71) Applicant: GM GLOBAL TECHNOLOGY OPERATIONS LLC, Detroit, MI (US)

(72) Inventors: Lei Hao, Troy, MI (US); Chandra S. Namuduri, Troy, MI (US); Suresh Gopalakrishnan, Troy, MI (US)

(73) Assignee: GM Global Technology Operations LLC., Detroit, MI (US)

( * ) Notice: Subject to any disclaimer, the term of this patent is extended or adjusted under 35 U.S.C. 154(b) by 0 days.

(21) Appl. No.: 15/811,740

(22) Filed: Nov. 14, 2017

(65) Prior Publication Data

US 2019/0145370 A1  May 16, 2019

(51) Int. Cl.
  *F02N 11/08* (2006.01)
  *H02P 23/00* (2016.01)
  *H02P 6/28* (2016.01)

(52) U.S. Cl.
  CPC ............ *F02N 11/087* (2013.01); *H02P 6/28* (2016.02); *H02P 23/0004* (2013.01); *F02N 2011/0874* (2013.01)

(58) Field of Classification Search
  CPC .................. H02P 6/28; H02P 23/0004; F02N 2011/0874; F02N 11/087
  (Continued)

(56) References Cited

U.S. PATENT DOCUMENTS 4,418,308 A * 11/1983 Bose .................. H02P 21/0003
                                                    318/803
5,963,706 A * 10/1999 Baik ....................... H02P 6/28
                                                    318/400.31
(Continued)

FOREIGN PATENT DOCUMENTS

CN        2711983 Y     7/2005
CN      101487434 A     7/2009
(Continued)

OTHER PUBLICATIONS

Namuduri et al., U.S. Appl. No. 15/961,198, filed Apr. 24, 2018.
(Continued)

*Primary Examiner* — Sean Gugger
(74) *Attorney, Agent, or Firm* — Quinn IP Law

(57) ABSTRACT

A starter for an internal combustion engine includes a multi-phase brushless electric motor, a controller and an inverter. A method for controlling the starter includes determining initial current commands for operating the electric motor in response to an activation command. Electrical current supplied to the electric motor and a rotational position of an output member of the electric motor are monitored. The electrical current is monitored directly without an intervening current prediction step. Interim voltage commands are determined based upon the initial current commands and the monitored currents, and final voltage commands are determined by subjecting the interim voltage commands to voltage limits. A rotational position compensation term is determined based upon the rotational position and rotational speed of the electric motor, and operation of the inverter is controlled to control the electric motor based upon the final voltage commands and the rotational position compensation term.

16 Claims, 4 Drawing Sheets

(58) Field of Classification Search
USPC .................................................. 290/38 R
See application file for complete search history.

(56) References Cited

U.S. PATENT DOCUMENTS

| | | | |
|---|---|---|---|
| 9,121,380 B2 | 9/2015 | Fulton | |
| 9,567,922 B2 | 2/2017 | Lofgren | |
| 2003/0183430 A1* | 10/2003 | Naito | B60K 6/485 |
| | | | 180/65.26 |
| 2003/0189375 A1 | 10/2003 | Raad | |
| 2004/0100216 A1* | 5/2004 | Makaran | H02P 29/02 |
| | | | 318/434 |
| 2005/0258795 A1* | 11/2005 | Choi | B29C 45/7666 |
| | | | 318/625 |
| 2006/0006829 A1* | 1/2006 | Anghel | H02P 9/009 |
| | | | 318/719 |
| 2006/0055361 A1* | 3/2006 | Eisenhardt | H02P 9/30 |
| | | | 318/712 |
| 2007/0121354 A1* | 5/2007 | Jones | H02M 5/4585 |
| | | | 363/47 |
| 2008/0079389 A1 | 4/2008 | Howell et al. | |
| 2010/0066289 A1* | 3/2010 | Kim | H02P 6/28 |
| | | | 318/434 |
| 2010/0156330 A1* | 6/2010 | Inoue | B60L 15/025 |
| | | | 318/400.02 |
| 2011/0009235 A1 | 1/2011 | Song et al. | |
| 2012/0025601 A1 | 2/2012 | Nefcy et al. | |
| 2012/0256523 A1* | 10/2012 | Fulton | F02N 11/02 |
| | | | 310/68 D |
| 2013/0134918 A1* | 5/2013 | Richards | H02P 25/03 |
| | | | 318/490 |
| 2013/0138328 A1 | 5/2013 | Shimo et al. | |
| 2013/0300371 A1 | 11/2013 | Bills | |
| 2014/0265954 A1* | 9/2014 | Kobayashi | B62D 5/046 |
| | | | 318/400.02 |
| 2015/0105949 A1 | 4/2015 | Wright et al. | |
| 2015/0115862 A1* | 4/2015 | Baloch | H02P 23/14 |
| | | | 318/561 |
| 2015/0180384 A1* | 6/2015 | An | F25B 1/005 |
| | | | 62/498 |
| 2016/0006311 A1 | 1/2016 | Li | |
| 2016/0111990 A1* | 4/2016 | Books | B60L 11/02 |
| | | | 322/23 |
| 2016/0111994 A1* | 4/2016 | Vovos | H02P 27/08 |
| | | | 318/494 |
| 2016/0313721 A1* | 10/2016 | Tazawa | H02P 23/0004 |
| 2017/0082012 A1 | 3/2017 | Jang | |
| 2017/0334422 A1 | 11/2017 | Namuduri et al. | |
| 2018/0030944 A1 | 2/2018 | Raad | |
| 2018/0091074 A1* | 3/2018 | Pramod | H02P 21/22 |
| 2018/0138845 A1* | 5/2018 | Tamura | H02P 21/22 |
| 2018/0167004 A1* | 6/2018 | Suzuki | H02P 21/05 |
| 2018/0234036 A1* | 8/2018 | Pallones | H02P 6/28 |
| 2018/0234037 A1* | 8/2018 | Suzuki | H02P 27/08 |

FOREIGN PATENT DOCUMENTS

| | | |
|---|---|---|
| EP | 0619427 B1 | 10/1994 |
| JP | 2000104650 A | 4/2000 |
| JP | 2003148317 A | 5/2003 |

OTHER PUBLICATIONS

Namuduri et al., U.S. Appl. No. 15/961,204, filed Apr. 24, 2018.
Quanbao Zhou, John Houldcroft, "Cold engine cranking torque requirement analysis," SAE International Inc., 2007, JSAE 20077002.
Hao et al., U.S. Appl. No. 15/158,887, filed May 19, 2016.
Hao et al., U.S. Appl. No. 15/417,734, filed Jan. 27, 2017.
Namuduri et al., U.S. Appl. No. 15/452,312, filed Mar. 7, 2017.

* cited by examiner

METHOD AND APPARATUS FOR OPERATING A STARTER FOR AN INTERNAL COMBUSTION ENGINE

INTRODUCTION

Internal combustion engines employ electrically-powered starters that are capable of spinning an engine crankshaft as part of an engine starting process.

SUMMARY

A starter for an internal combustion engine is described, and includes a multi-phase brushless electric motor, a controller and an inverter. A method for controlling the starter includes determining initial current commands for operating the electric motor in response to an activation command. Electrical current supplied to the electric motor and a rotational position of an output member of the electric motor are monitored. The electrical current is monitored directly without an intervening current prediction step. Interim voltage commands are determined based upon the initial current commands and the monitored currents, and final voltage commands are determined by subjecting the interim voltage commands to voltage limits. A rotational position compensation term is determined based upon the rotational position and rotational speed of the electric motor, and operation of the inverter is controlled to control the electric motor based upon the final voltage commands and the rotational position compensation term.

An aspect of the disclosure includes the initial current commands for operating the electric motor being determined in response to an activation command to start the internal combustion engine.

Another aspect of the disclosure includes the interim voltage commands being determined via a decoupled current controller element based upon the initial current commands and the feedback currents.

Another aspect of the disclosure includes the interim voltage commands being based upon the initial current commands and the feedback currents employing a proportional/integrator control routine, wherein the integrator is subjected to a dynamic integrator clamping element.

Another aspect of the disclosure includes the interim voltage commands being space-vector voltage commands including a d-axis interim voltage command and a q-axis interim voltage command, wherein the dynamic integrator clamping element includes a d-scale voltage limit and a q-scale voltage limit. The d-scale voltage limit is determined based upon the interim d-axis voltage command and a system voltage, and the q-scale voltage limit is determined based upon the interim q-axis voltage command and the system voltage. The d-axis interim voltage command is dynamically subjected to the d-scale voltage limit, the q-axis interim voltage command is dynamically subjected to the q-scale voltage limit.

Another aspect of the disclosure includes monitoring, via sensors, electrical current transferred to the electric motor and a rotational position of the pinion gear.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. Furthermore, the disclosure, as illustrated and described herein, may be practiced in the absence of an element that is not specifically disclosed herein.

Figure 1:
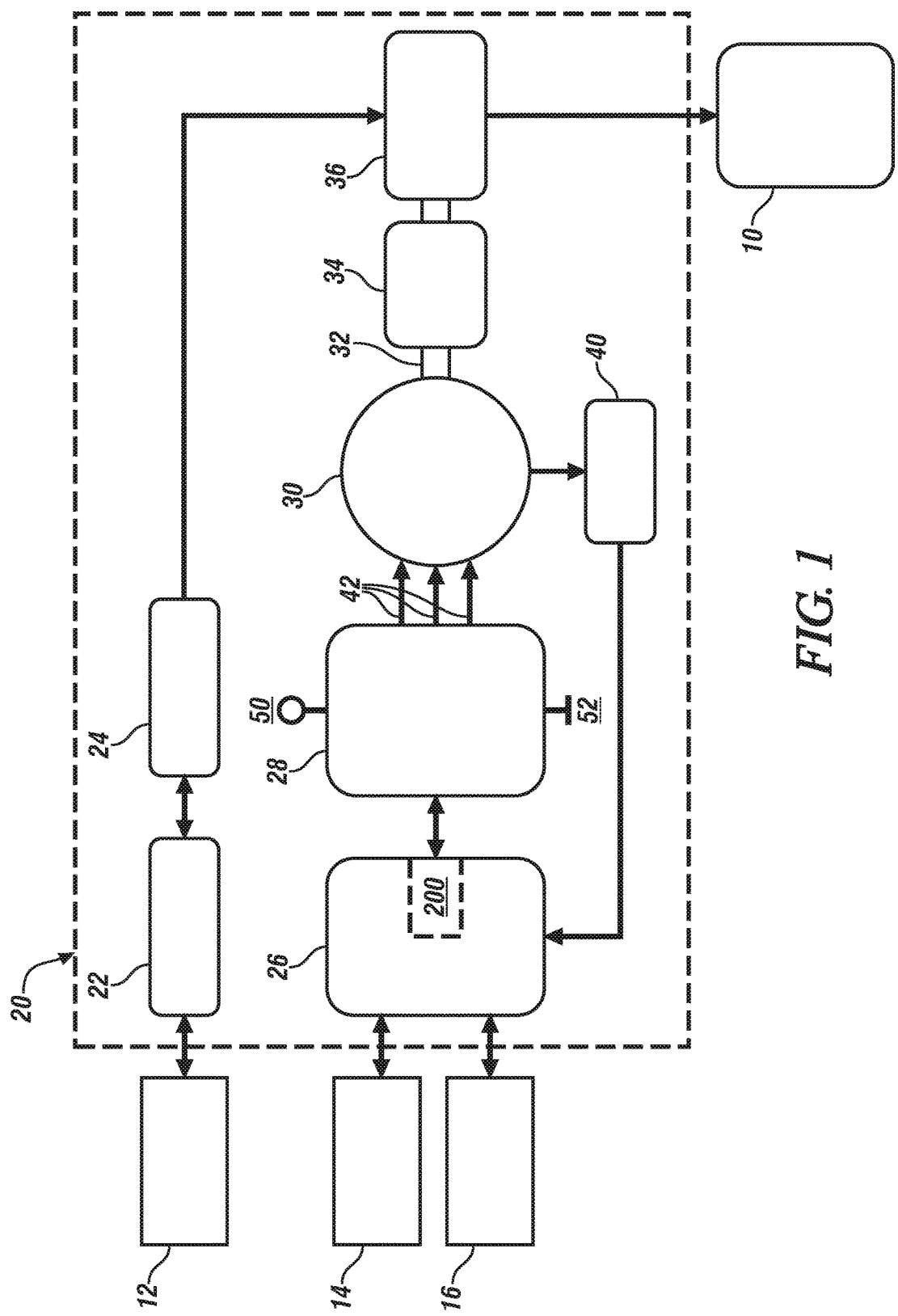
FIG. 1 schematically illustrates a starter that may be disposed on an internal combustion engine, in accordance with the disclosure.

Referring to the drawings, wherein like reference numerals correspond to like or similar components throughout the several Figures, FIG. 1, consistent with embodiments disclosed herein, illustrates a starter 20 that may be disposed on an internal combustion engine 10 that is an element of a drivetrain that is employed on a vehicle. The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The starter 20 includes a multi-phase permanent magnet brushless electric motor (electric motor) 30 coupled to a pinion gear 36, an inverter 28 and a controller 26. A DC power source 50 (and associated electrical ground 52) is disposed to supply electric power to the inverter 28, which is electrically connected to the electric motor 30 via a plurality of electrical cables 42 or is directly integrated with electric motor 30, and the controller 26 is disposed to control flow of electric power to the inverter 28.

The electric motor 30 includes a rotor member 32 that couples to a pinion gear 36 via a gear mechanism 34 in one embodiment. The pinion gear 36 is a slidable device that includes a one-way clutch mechanism in one embodiment.

A pinion control solenoid 22 couples to a pinion control lever arm 24 to activate the pinion gear 36 in response to a pinion gear command signal 12. The pinion gear 36 can be activated to engage a flywheel of the internal combustion engine 10 to spin a crankshaft thereof during an engine starting process. Rotational position of the rotor member 32 is monitored by a rotational position sensor 40, which provides a signal input to the controller 26.

The inverter 28 includes a plurality of paired switching elements that electrically connect to the electric motor 30 via the cables 42 or via machine terminal wires. The paired switching elements may be power transistors in one embodiment, e.g., MOSFETs or IGBTs. The inverter 28 includes a plurality of current sensors (not shown) that are disposed to monitor the electrical current that is supplied to the electric motor 30, with such information being communicated to the controller 26.

The controller 26 includes a processor, a memory device, and a plurality of gate drivers that are in communication with the power transistors of the inverter 28. The controller 26 is in communication with a motor control signal 14 and a communication link 16. Operation of the inverter 28 is controlled by the controller 26.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 50 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The terms "calibration", "calibrate", and related terms refer to a result or a process that compares an actual or standard measurement associated with a device with a perceived or observed measurement or a commanded position. A calibration as described herein can be reduced to a storable parametric table, a plurality of executable equations or another suitable form. A parameter is defined as a measurable quantity that represents a physical property of a device or other element that is discernible using one or more sensors and/or a physical model. A parameter can have a discrete value, e.g., either "1" or "0", or can be infinitely variable in value.

Figure 2:
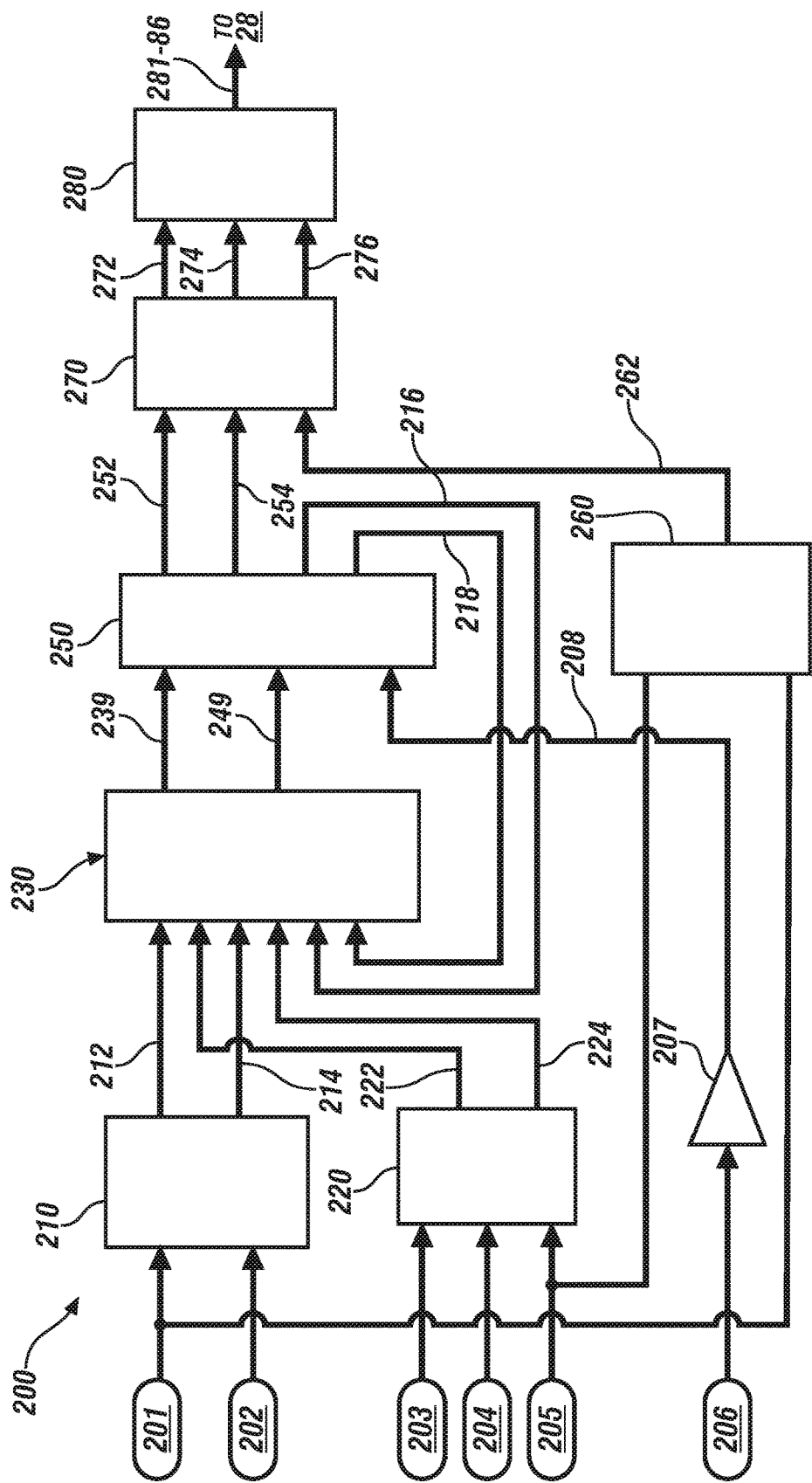
FIGS. 2 and 3 schematically show details of a control routine for controlling operation of an embodiment of the starter that is described with reference to FIG. 1 to effect engine starting, in accordance with the disclosure.
Figure 3:
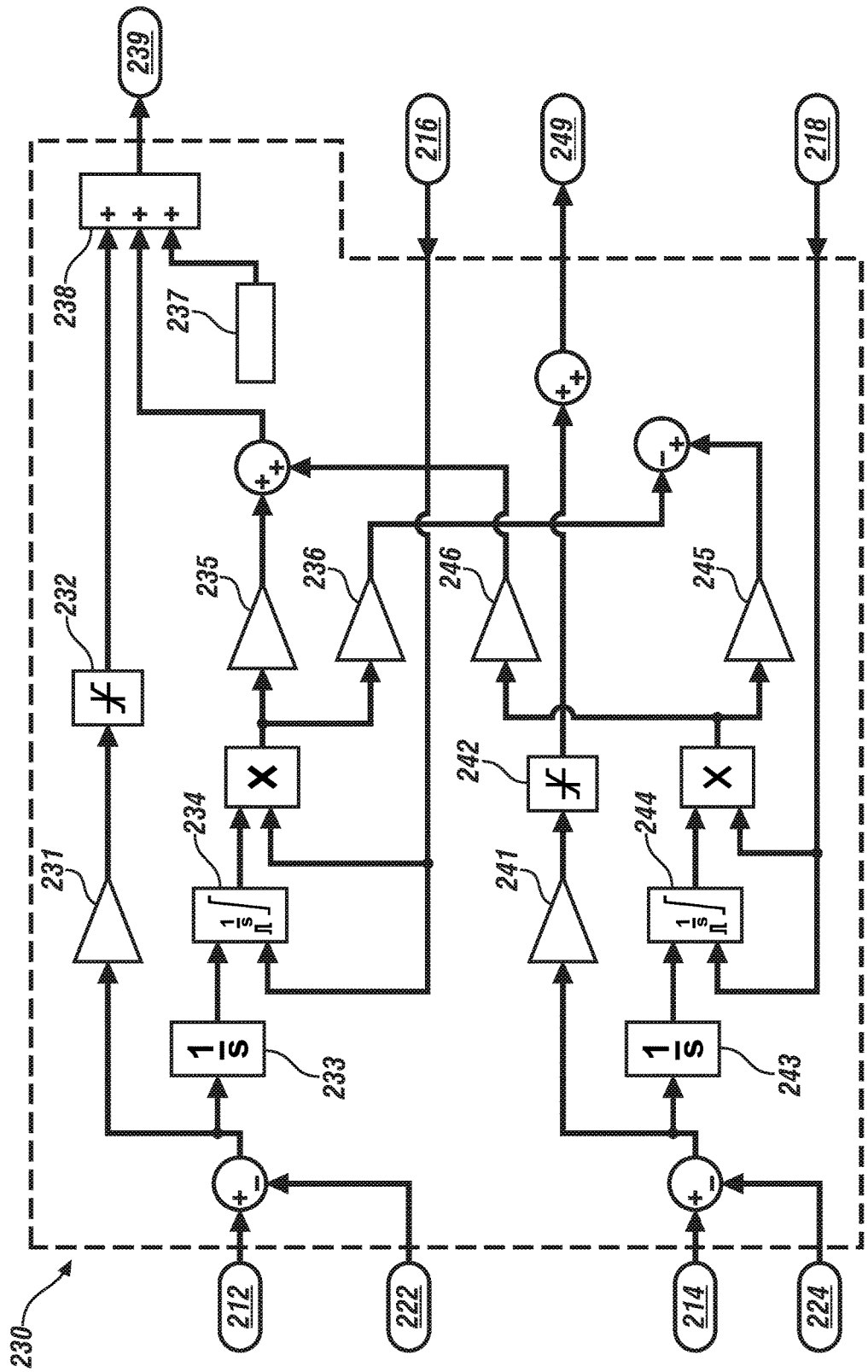

FIGS. 2 and 3 schematically show details of a control routine 200 for controlling operation of an embodiment of the starter 20 that is described with reference to FIG. 1 during an engine starting event. The control routine 200 is executed in the controller 26 to operate the electric motor 30 in response to the motor control signal 14, which can be activated to spin the internal combustion engine 10 to effect engine starting. It is appreciated that spinning the internal combustion engine 10 is one part of an engine starting event, which can also include routines for controlling engine fueling, spark timing, and other control parameters. The motor control signal 14 can be initiated by a key-on command from a vehicle operator, or by an autostart command that may be associated with an autonomous vehicle operating routine, or by a hybrid powertrain system control routine, or another engine start event initiating routine. The concepts described herein apply to all control routines that are associated with controlling an embodiment of the electric motor 30 described herein to effect a rapid increase in speed and torque output therefrom.

The control routine 200 generates a plurality of pulsewidth-modulated (PWM) commands 281-286, which are input to the switch elements of the inverter 28 to supply PWM electric power to the electric motor 30 via the plurality of electric cables 42. Signal inputs to the control routine 200 originate with the motor control signal 14 and include a rotational speed command 201 and a motor torque command 202. Monitored parameters include inputs from the current sensors that are disposed to monitor the electrical current that is supplied to the electric motor 30, including a first current 203 that is input to the electric motor 30 via one of the electric cables 42 and a second current 204 that is input to the electric motor 30 via another of the electric cables 42. Other inputs include a rotational position 205 of the electric motor 30, as indicated by the rotational position sensor 40, and a supply voltage 206, which is based upon the voltage level of the DC power source 50.

The control routine 200 includes a current command generation element 210, a current transformation element 220, a decoupled current controller element 230, a voltage limiter 250, a position compensation element 260, a voltage transformation element 270, and a PWM command generation element 280 to generate the PWM commands 281-286.

The outputs of the current command generation element 210, the current transformation element 220, the decoupled current controller element 230 and the voltage limiter 250, and the inputs to the voltage transformation element 270 are described and analyzed in a space-vector domain, and the outputs of the voltage transformation element 270 and the PWM command generation element 280 are described, analyzed and executed in a time domain. The relationship between the space-vector domain and the time domain is detailed with reference to Park's transformation and derivations therefrom. The space-vector domain is described in context of a direct axis (d-axis) and a quadrature axis (q axis), and related d, q terms.

The current command generation element 210 determines initial current commands iq_cmd 212 and id_cmd 214 based upon the rotational speed command 201 or the motor torque command 202. In one embodiment, the rotational speed command 201 and the motor torque command 202 are maximum rated values for the electric motor 30 that are commanded via a step-input. Alternatively, the rotational speed command 201 and the motor torque command 202 can be ramped-in values or another control command. The initial current commands iq_cmd 212 and id_cmd 214 are space-vector commands that are derived employing Park's transform.

The current transformation element 220 determines feedback current commands iq_fb 222 and id_fb 224 based upon the first and second monitored currents 203, 204 and the rotational position 205 of the electric motor 30. The current transformation element 220 determines the feedback current commands iq_fb 222 and id_fb 224 based upon direct measurement of the first and second monitored currents 203, 204 and without an intervening prediction step that would determine the first and second currents, which would introduce measurement latencies.

The decoupled current controller element 230 determines interim voltage commands Vq_ctrl 239, Vd_ctrl 249 based upon the initial current commands iq_cmd 212, id_cmd 214 and the feedback current commands iq_fb 222, id_fb 224, employing integrator elements with scaled integrator saturation terms Vd_scale 218 and Vq_scale 216. Details of the decoupled current controller element 230 are provided with reference to FIG. 3.

The voltage limiter 250 subjects the interim voltage commands Vq_ctrl 239, Vd_ctrl 249 to limitations to determine output voltage commands Vq_out 252, Vd_out 254, respectively. The voltage limiter 250 employs a gain element 208, which is determined based upon the DC supply voltage 206 that has been transformed from the time domain to the space vector domain, and is equal to voltage Vs 206 divided by the square root of 3 via element 207. The output voltage commands Vq_out 252, Vd_out 254 are determined in the space vector domain. The d-axis output voltage command Vd_out 254 is equal to Vd_ctrl 249 if Vd_ctrl 249 is less than its maximum value Vd_max and equal to Vd_max if Vd_ctrl 249 is greater than Vd_max. The Vd_max term is an application-specific preset value that is based upon the magnitude of the voltage supplied by the DC power source 50 and calculated maximum Vd voltage using machine parameters and d-axis voltage equation, and is preferably determined in relation to peak phase voltage. The q-axis output voltage command Vq_out 252 is equal to Vq_ctrl 239 if Vq_ctrl 239 is less than its maximum value Vq_max and equal to Vq_max if Vq_ctrl 239 is greater than Vq_max. Vq_max can be determined as follows:

$$V_{q\_max} = \sqrt{V_s^2 - V_{d\_max}^2}$$

wherein:
$V_s$ is the maximum machine terminal which is equal to voltage Vs 206 divided by the square root of 3, i.e., element 208,
$V_{q\_max}$ is the maximum q-axis output voltage command, and
$V_{d\_max}$ is the maximum d-axis output voltage command.

The position compensation element 260 determines a compensated rotational position 262 based upon the rotational position 205 and the rotational speed 201. The position compensation element 260 takes into account the dynamic nature of the rotation of the electric motor 30 during a starting event. The position compensation element 260 can be determined as follows:

$$\text{Com\_Position} = k_{calibrated} * \text{speed} * \text{delayed angle}$$

wherein:
Com_Position is the position compensation element 260,
$k_{calibrated}$ has a value that is greater than 1.5, and is employed to compensate sample delay and correct the current feedback,
speed is the rotational speed 201 of the electric motor 30, and
delayed angle is the theoretical position delay due to sampling of rotational position 205 of the electric motor 30.

The final voltage commands Vq_out 252, Vd_out 254 are transformed from the space vector domain to the time domain via a voltage transformation element 270, taking into account the compensated rotational position 262. The time domain voltage commands include Vas 272, Vbs 274 and Vcs 276, which are input to the PWM command generation element 280 to generate the PWM commands 281-286 for controlling individual switches of the inverter 28.

The decoupled current controller element 230 is a current regulating element that includes proportional and integral elements to determine the interim voltage commands Vq_ctrl 239, Vd_ctrl 249, operating as follows. Differences between the initial current commands iq_cmd 212, id_cmd 214 and the respective feedback current commands iq_fb 222, id_fb 224 are determined, and input to respective q, d gain operators 231, 241, and gain saturation limiters 232, 242. The differences between the initial current commands iq_cmd 212, id_cmd 214 and the respective feedback currents commands iq_fb 222, id_fb 224 are also input to respective first and second integrators 233, 243, and first and second dynamic integrator clamping elements 234, 244. The first dynamic integrator clamp 234 employs a q-scale voltage limit, i.e., Vq_scale 216, which imposes a maximum value to the output of the first integrator 233. Similarly, the second dynamic integrator clamp 244 employs a d-scale voltage limit, i.e., Vd_scale 218, which imposes a maximum value to the output of the second integrator 243. The output of the first dynamic integrator clamp 234 is subjected to a gain factor 235 and input from an anti-windup element 246 from the second gain saturation limiter 242, and combined with the output from the first gain saturation limiter 232 and a constant term 237 via a summing element 238 to determine the first interim voltage command Vq_ctrl 239. Similarly, the output of the second dynamic integrator clamp 244 is subjected to a gain factor 245 and input from an anti-windup element 236 from the first dynamic integrator clamp 234, and combined with the output from the second gain saturation limiter 242 to determine the second interim voltage command Vd_ctrl 249. The purpose of the first and second dynamic integrator clamping elements 234, 244 is to limit voltage overshoot during dynamic operation, thus limiting likelihood of attendant saturation and/or oscillation during a starting event.

The q-scale voltage limit, i.e., Vq_scale 216 and the d-scale voltage limit, i.e., Vd_scale 218 are dynamically determined during execution of each starting event, as follows. When the d-axis interim voltage command Vd_ctrl 249 is greater than the machine terminal voltage, Vs, the d-scale voltage limit can be determined as follows:

$$V_{d\_scale} = \frac{V_s}{V_{d\_ctrl}}$$

wherein:

$V_{d\_ctrl}$ is the d-axis interim voltage command Vd_ctrl 249, and $V_{d\_scale}$ is the d-sc ale voltage limit, i.e., Vd_scale 218.

When the q-axis interim voltage command Vq_ctrl 239 is greater than the machine terminal voltage Vs 206, the q-scale voltage limit Vq_scale 216 can be determined as follows:

$$V_{q\_scale} = \frac{V_s}{V_{q\_ctrl}}$$

wherein:

$V_{q\_scale}$ is the q-scale voltage limit Vq_scale 216, and $V_{q\_ctrl}$ is the q-axis interim voltage command Vq_ctrl 239.

Otherwise, the q-scale voltage limit, i.e., Vq_scale 216 and the d-scale voltage limit, i.e., Vd_scale 218 are set equal to 1.0.

The decoupled current controller element 230 provides a simplified control algorithm that limits voltage overshoot during dynamic operation without employing current prediction routines.

Figure 4:
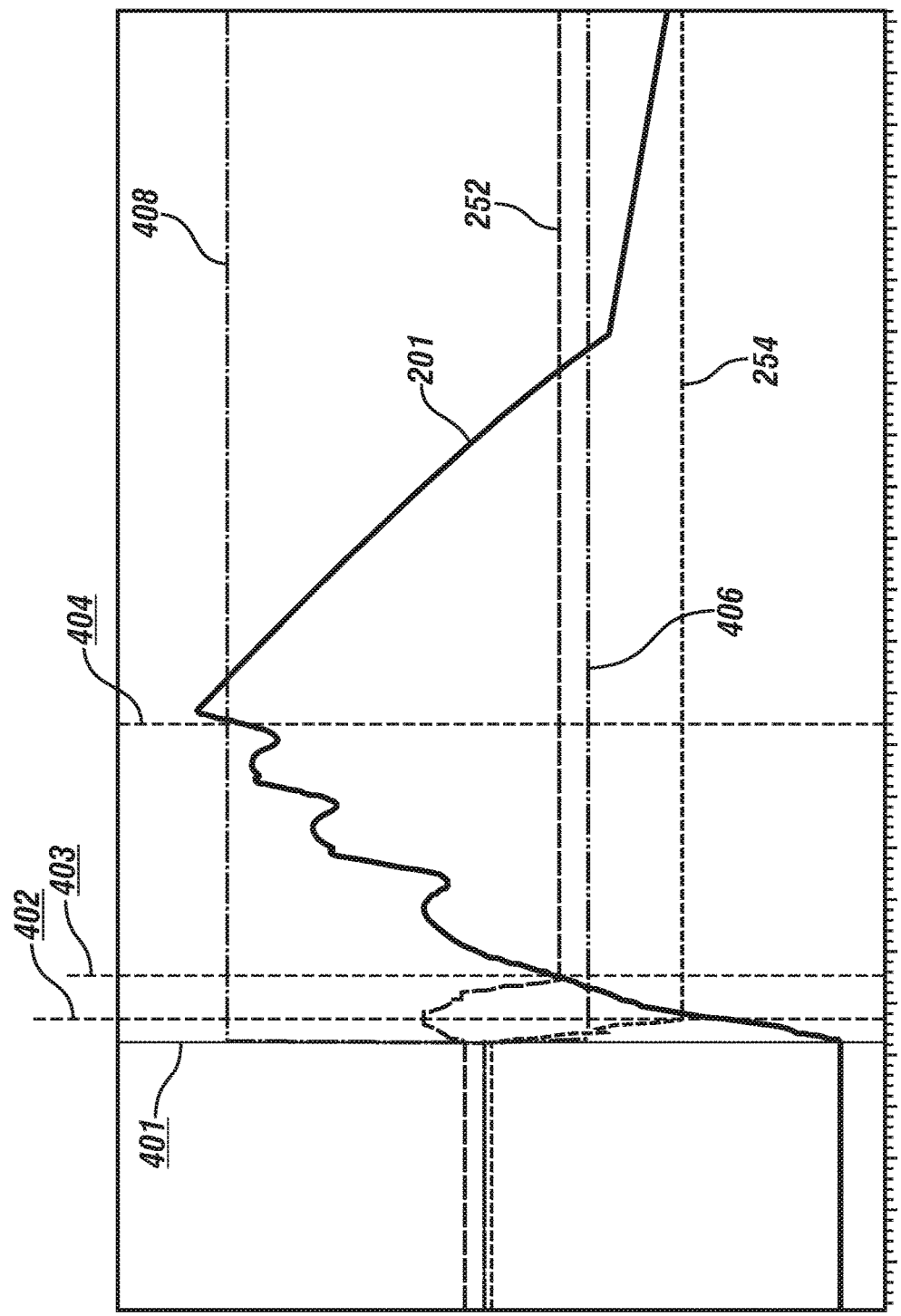
FIG. 4 graphically shows parameters associated with operation of an embodiment of the starter employing the control routine described with reference to FIGS. 2 and 3, in accordance with the disclosure.

FIG. 4 graphically shows parameters associated with operation of an embodiment of the starter 20 employing the control routine 200 described herein, including output voltage commands Vq_out 252 and Vd_out 254, reference currents Id_ref 406 and Iq_ref 408, and rotational speed 201, all plotted in relation to elapsed time on the horizontal axis during a starting event. At timepoint 401, a starting event initiates, with initial changes in the reference currents, i.e., Id_ref 406 and Iq_ref 408 and associated increase in the output voltage command Vq_out 252 and decrease in the output voltage command Vd_out 254, until timepoint 402, when a corresponding maximum and minimum value are achieved. The rotational speed 201 increases, and the output voltage command Vq_out 252 begins to decrease in response to the control routine 200. At timepoint 403, the voltage command Vq_out 252 reaches a stasis point, and the rotational speed 201 continues to increase albeit with controls imposed on the output voltage commands Vq_out 252 and Vd_out 254 and the reference currents, i.e., Id_ref 406 and Iq_ref 408. At timepoint 404, the rotational speed 201 reaches a peak. However, the voltage overshoot is limited during dynamic operation without employing current prediction routines.

The control routine 200 provides a fast and robust response for control of embodiments of the electric motor 30, which in one embodiment can include a speed increase of 25,000 rpm (1.67 kHz frequency) in less than 200 ms, with an associated maximum torque/power over the entire operating range to effect robust engine starting performance over a range of engine and ambient operating condition. The control routine 200 operates without a current prediction step or current adjustment related to current prediction.

The control routine 200 includes a current control algorithm that maximizes the output power and torque within a very short operating time period as well as achieving consistent and reliable starting performance. The voltage limit routine described with reference to FIG. 3 facilitates stable performance over a broad speed range, and includes position compensation that accounts for sample delay for both current and position.

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may generally be referred to herein as a "module" or "system." Furthermore, the present disclosure may take the form of a computer program product embodied in a tangible medium of expression having computer-usable program code embodied in the medium.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special-purpose hardware-based systems that perform the specified functions or acts, or combinations of special-purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for controlling a starter that is disposed on an internal combustion engine, the starter including a multiphase electric motor, a controller and an inverter, the method comprising:

determining initial current commands for operating the electric motor in response to an activation command, wherein the activation command includes a rotational speed command concurrent with a motor torque command;

determining electrical current transferred from a DC power source to the electric motor and a rotational position of an output member of the electric motor, wherein the electrical current is determined directly without an intervening current prediction step;

determining feedback currents from the electric motor based upon the electrical current transferred to the electric motor and the rotational position;

determining interim voltage commands based upon the initial current commands and the feedback currents;

subjecting the interim voltage commands to voltage limits to determine final voltage commands;

determining a position compensation term based upon the rotational position and a rotational speed of the electric motor; and controlling, via the controller, operation of the inverter in a pulse width-modulated mode to control the electric motor based upon the final voltage commands and the position compensation term.

2. The method of claim 1, wherein the activation command comprises a command to start the internal combustion engine, and wherein the initial current commands for operating the electric motor are determined in response to the rotational speed command and the motor torque command associated with the activation command.

3. The method of claim 1, wherein determining the interim voltage commands based upon the initial current commands and the feedback currents comprises determining, via a decoupled current controller element, the interim voltage commands based upon the initial current commands and the feedback currents.

4. The method of claim 1, wherein determining the interim voltage commands based upon the initial current commands and the feedback currents further comprises employing a proportional/integrator control routine to determine the interim voltage commands, wherein the integrator is subjected to a dynamic integrator clamping element and an anti-windup element from a gain saturation limiter.

5. The method of claim 1, further comprising:

wherein the interim voltage commands include space-vector voltage commands including a d-axis interim voltage command and a q-axis interim voltage command, wherein the dynamic integrator clamping element includes a d-scale voltage limit and a q-scale voltage limit, and wherein the d-scale voltage limit is determined based upon the interim d-axis voltage command and a system voltage;

wherein the q-scale voltage limit is determined based upon the interim q-axis voltage command and the system voltage;

wherein the d-axis interim voltage command is dynamically subjected to the d-scale voltage limit; and wherein the q-axis interim voltage command is dynamically subjected to the q-scale voltage limit.

6. The method of claim 1, further comprising, monitoring, via sensors, electrical current transferred to the electric motor and the rotational position of the output member of the electric motor.

7. A method for controlling a starter that is disposed on an internal combustion engine, the starter including a multi-phase brushless electric motor coupled to a rotatable pinion gear, a controller and an inverter, the method comprising:

determining initial current commands for operating the electric motor in response to an activation command, wherein the activation command includes a rotational speed command concurrent with a motor torque command;

monitoring, via current sensors, electrical current transferred from a DC power source to the electric motor, wherein the electrical current is monitored directly without an intervening current prediction step;

monitoring, via a rotational position sensor, a rotational position of the pinion gear;

determining feedback currents from the electric motor based upon the electrical current transferred to the electric motor and the rotational position of the pinion gear;

determining interim voltage commands based upon the initial current commands and the feedback currents, including employing a proportional/integrator control routine to determine the interim voltage commands, wherein the integrator is subjected to a dynamic integrator clamping element and an anti-windup element from a gain saturation limiter;

subjecting the interim voltage commands to voltage limits to determine final voltage commands;

determining a rotational position compensation term based upon the rotational position of the pinion gear and a rotational speed of the electric motor;

determining pulse width-modulated commands for controlling the inverter based upon the final voltage commands and the rotational position compensation term; and controlling, via the controller, operation of the inverter to control the electric motor based upon the pulse width-modulated commands.

8. The method of claim 7, wherein the activation command comprises a command to start the internal combustion engine, and wherein the initial current commands for operating the electric motor are determined in response to the rotational speed command and the motor torque command associated with the activation command.

9. The method of claim 7, wherein determining the interim voltage commands based upon the initial current commands and the feedback currents comprises determining, via a decoupled current controller element, the interim voltage commands based upon the initial current commands and the feedback currents.

10. The method of claim 7, further comprising:

wherein the interim voltage commands comprise space-vector voltage commands including a d-axis interim voltage command and a q-axis interim voltage command, wherein the dynamic integrator clamping element includes a d-scale voltage limit and a q-scale voltage limit, and wherein the d-scale voltage limit is determined based upon the interim d-axis voltage command and a system voltage;

wherein the q-scale voltage limit is determined based upon the interim q-axis voltage command and the system voltage;

wherein the d-axis interim voltage command is dynamically subjected to the d-scale voltage limit; and wherein the q-axis interim voltage command is dynamically subjected to the q-scale voltage limit.

11. The method of claim 7, further comprising, monitoring, via sensors, electrical current transferred to the electric motor and a rotational position of the pinion gear.

12. A starter disposed on an internal combustion engine, comprising:

a multi-phase brushless electric motor coupled to a rotatable pinion gear, a controller, a DC power source, and an inverter, the controller operatively connected to the inverter, the controller including an instruction set, the instruction set executable to:

determine initial current commands to operate the electric motor in response to an activation command, wherein the activation command includes a rotational speed command concurrent with a motor torque command;

monitor electrical current transferred to the electric motor from the DC power source, and a rotational position of the pinion gear;

determine feedback current commands for the electric motor based upon the electrical current transferred to the electric motor and the rotational position of the pinion gear;

determine interim voltage commands based upon the initial current commands and the feedback currents, including employing a proportional/integrator control routine to determine the interim voltage commands, wherein the integrator is subjected to a dynamic integrator clamping element and an anti-windup element from a gain saturation limiter;

subject the interim voltage commands to voltage limits to determine final voltage commands;

determine a rotational position compensation term based upon the rotational position of the pinion gear and a rotational speed of the electric motor; and control operation of the inverter in a pulse width-modulated mode to control the electric motor based upon the final voltage commands and the rotational position compensation term.

13. The starter of claim 12, further comprising, monitoring, via sensors, electrical current transferred to the electric motor and a rotational position of the pinion gear.

14. The method of claim 1, wherein the position compensation element is determined based upon the rotational speed of the electric motor and a theoretical position delay due to sampling of the rotational position of the electric motor.

15. The method of claim 7, wherein the position compensation element is determined based upon the rotational speed of the electric motor and a theoretical position delay due to sampling of the rotational position of the electric motor.

16. The starter of claim 12, wherein the rotational position compensation element is determined based upon the rotational speed of the electric motor and a theoretical position delay due to sampling of the rotational position of the electric motor.

* * * * *